Dec. 13, 1949     S. D. LESESNE     2,491,188
FLAT POWER TRANSMISSION BELT
Filed Dec. 22, 1945
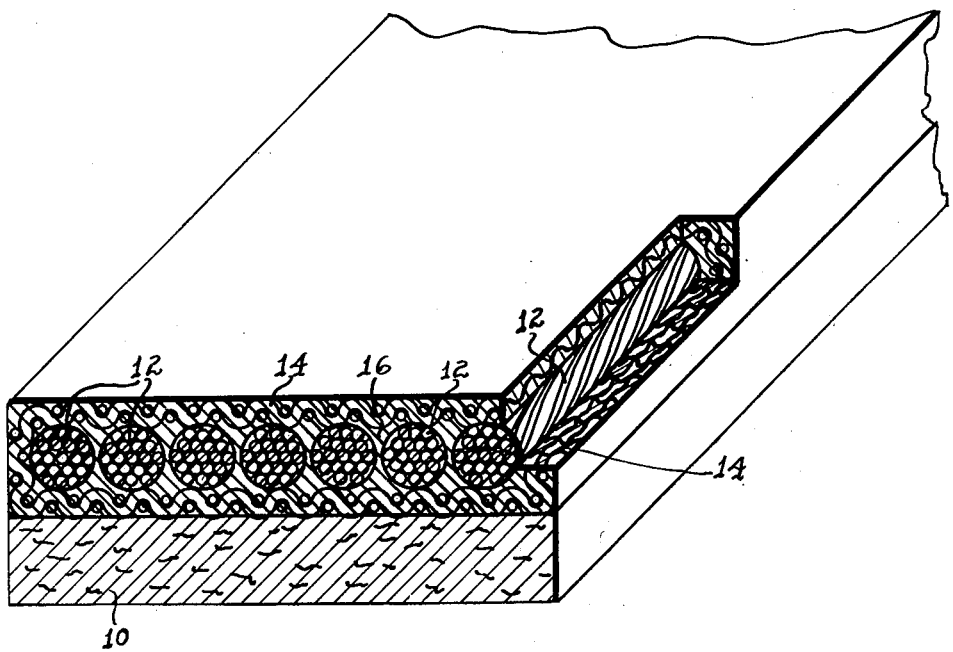
Inventor
Sherman D. Lesesne
By Clayton R. Jenks
Attorney
Witness
Herbert E. Covey Patented Dec. 13, 1949

2,491,188

UNITED STATES PATENT OFFICE 2,491,188

FLAT POWER TRANSMISSION BELT

Sherman D. Lesesne, Worcester, Mass., assignor to Graton & Knight Company, Worcester, Mass., a corporation of Massachusetts Application December 22, 1945, Serial No. 636,567

2 Claims. (Cl. 74—232)

This invention relates to flat power transmission belts and more particularly to a flat belt having a leather traction surface.

Leather makes a satisfactory and efficient material for a belt, and its fibrous structure is such that the belt may be curried or impregnated with materials which increase the traction effort and prolong the life of the belt. On the other hand, leather tends to elongate permanently when subjected to the high tensional forces often required for the traction effort. Reinforcing such a belt involves many problems. For example, I have found that it is not satisfactory to reinforce the belt solely by means of several plies of rubberized woven fabric cemented to the belt. One disadvantage is that the textile strands or weft running crossways of the belt are not subjected to tension and are not directly useful. This built-up multi-ply fabric layer is of necessity a very stiff body and it does not have sufficient flexibility for use with small pulleys. The fabric layer at the outer surface of the belt carries the greater load as the belt goes around the pulley, and the stress thereon causes this particular layer of fabric to break down first so that the belt disintegrates initially at its outside layer. The cross strands or weft also work against the longitudinal strands or warp and tend to wear them and thus weaken the reinforcing structure. It, however, is necessary that the belt remain flexible and that the tension resisting members be capable of permitting a temporary change in shape of the belt as it passes over a pulley without injuring the belt structure and yet which permits the required elongation of the outer layer of the belt carrying the reinforcement.

The primary object of this invention is to overcome such problems and provide a power transmission leather belt with a reinforcement which minimizes permanent elongation and yet insures adequate flexibility for severe conditions of usage and which will give a long life of useful service. Other objects will be apparent in the following disclosure.

Referring to the drawing illustrating one embodiment of my invention, the figure is a fragmentary perspective view, partly broken away, of a leather belt reinforced by a backing secured thereto.

In accordance with my invention, I have provided a reinforced belt made primarily of leather strips 10 suitably cut and cemented together in the desired length. The leather may be curried or suitably treated or filled with various traction increasing or belt preserving agents. The reinforcement for the belt is composed of a single cord or a plurality of cords 12 extending substantially the entire length of the belt. The reinforcement cords are preferably made of twisted cotton, rayon or nylon threads, and the size of the cord will depend upon the size of the belt and the tension requirements. Ordinarily, each cord will be from 1/64" to 1/4" in diameter. I prefer to employ textile cords of the general type and structure that are used for reinforcing automobile tires and rubber belts. These are multi-twisted or spun strands of textile fibres or threads. These cords may be directly secured in position on the back or non-traction portion of the belt by means of an elastic body of rubber or by a suitable elastic cement, such as plasticized cellulose nitrate, or a rubber cement formed of natural or synthetic rubber.

As a further anchoring medium, I may wrap a protective and confining layer 14 of duck or other woven textile fabric around the cords, so that they cannot move laterally to a material extent. I prefer to use only a single layer of the cords 12 and to separate them from the fabric 14 by an elastic rubber body, so that the reinforcing backing will be adequately flexible and thereby avoid the disadvantage found in belts which have many layers of fabric cemented together as a very stiff body. The flexibility of this single layer of reinforcement cords enables the belt to pass around a very small pulley without breaking down the reinforcement structure. Hence the machine pulleys may be located quite close to one another, and the almost constant flexing of the belt will not cause it to be overheated or otherwise injured by the repeated flexing action.

The textile cords 12 are preferably supported resiliently in a parallel arrangement longitudinally of the belt by being embedded in an elastic medium 16, such as rubber. This elastic medium holds the fabric wrapping 14 in place around the tension cords 12 and thus makes a strong and yet flexible backing. This backing may be premade as a belt unit and then secured to the leather body by cement. Various cements used in the leather belt industry may be employed, such as a rubber cement or plasticized cellulose nitrate.

The belt may be made endless at the factory by first constructing a leather belt in accordance with standard practice, wherein strips of leather are cemented together at their juxtaposed bevelled edges by means of suitable cement, such as plasticized cellulose nitrate. The plasticizer may be camphor, butyl phthalate or amyl phthalate. After the endless leather body 10 has been made, the reinforcing cord or cords may be secured directly thereto by wrapping the cord around the leather belt in a plurality of convolutions. The cords are secured in place by means of a plastic rubber or cellulose nitrate cement previously applied to the face of the leather.

I may mount one or more reinforcing cords in a band of mastic, such as a soft synthetic or natural rubber. This may be accomplished by placing a rubber band on a large drum and then rotating the drum and feeding the cord thereto by means of a reciprocable guide which properly lays the cord in place just as thread is laid on a sewing machine bobbin. The cord may be held under sufficient tension to embed it in the rubber. Thereafter, the strip of rubber is removed from the drum, vulcanized and cemented to the back face of the leather belt by means of a rubber or a cellulose nitrate cement.

The reinforcing backing of rubberized cords and fabric may be made up initially as an endless body; and this endless body may be slid laterally onto a premade endless leather belt carrying a suitable hardenable plastic cementing medium. The parts are forced together, as by means of pressure rolls. Then the cement is hardened, as by vulcanizing a rubber cement or mastic.

The construction shown in the drawings may be made of a plurality of strands of textile cord coated with a layer of rubber cement and arranged in parallelism within a wrapping of fabric 14 which has been likewise rubberized or treated with cement so that the fabric will stick to the cord strands and provide a waterproof surface. This portion of the belt structure may be formed by laying the cord strands 12 substantially in contact with one another on a strip of fabric to which rubber cement has been applied. The strands may be formed of a single cord or a plurality. Then the fabric is folded over the tops of the cord strands and secured in position. The plastic rubber used to hold the cord and fabric in place may be suitably compounded with sulphur such as from 1 to 5% by weight and a vulcanization accelerator as well as with carbon black and zinc oxide or other materials. It may be a synthetic rubber that is resistant to mineral lubricating oils or other chemicals. This body of cord and fabric has the vulcanizable rubber located in the interstices between the strands of the fabric and of the cord. After being vulcanized by the application of a suitable degree of heat to form a coherent body, this reinforcing body may be cemented to the back side of the leather belt 10 by means of rubber or cellulose nitrate cement or other desired cementing medium.

The free ends of the cord or cords which are wrapped in a plurality of strands around the leather belt are held in place by the adhesion of the cementing medium and particularly by a vulcanized soft rubber so that longitudinal movement of the cord relative to the belt is prevented. Also, if the belting is made up in long pieces and then cut to a desired length, the free ends of the piece may be bevelled in accordance with standard practice and suitably cemented together.

It is desirable that only a thin or fine mesh fabric be wrapped around the cords, and preferably in only a single layer with a slight overlapping, in order to prevent making the belt too stiff. This fabric is preferably made up of a fine mesh of material as compared with the size of the reinforcing cords. For example, if the cords are ⅛ to ¼" in diameter, the fabric may be made of woven thread of from 20 to 100 size as measured in the textile industry. This fabric is not intended to serve to any material extent as a reinforcing medium or tension resisting material, but it acts primarily as a wrapping to hold the longitudinal cords in place and to secure the reinforced rubber body to the leather.

The textile cords are preferably prestretched during manufacture or assembly, so that after the belt has been run for a few hours to take out the stiffness and bring it to a normal elongation, it will not stretch thereafter more than 4 to 6% without breaking. This insures that the cords subjected to a normal belt tension will not stretch more than about a permissible 1% during 100 hours of normal usage and thus will hold the belt at a substantially permanent length.

When the tight side or run of a belt between two pulleys is pulling at a given tension at the maximum load permitted for that belt, the breaking tension should be at least ten times that normal load pulling tension; hence the number of the strands and the cord size must be such as to provide this safety factor. The cord may vary in size and the number of cord strands should be proportioned according to the load requirements. For large sized cords, only a single layer will be used, but when the cord is small, such as ₁⁄₁₆" diameter, it is permissible to have the cord strands overlapping in two or more layers, but separated by the elastic supporting medium to prevent chafing. It is to be understood that the plurality of cord strands which extend in parallelism lengthwise of the leather strip may be formed from a single cord properly laid in place, or several separate cords may be employed to form the plurality of strands.

The size of the cord will also depend upon the size of the belt. For example, a leather belt which is 6" wide and ¹¹⁄₆₄ inch thickness may be reinforced by cotton, rayon or nylon threads twisted as a cord having a diameter of about ₁⁄₁₆ inch, and the cords may be arranged in a single layer close to one another throughout the width of the belt. This belt will stand a longitudinal tension of 1000 pounds without stretching more than 0.1% after the belt has been running for a few hours. A smaller belt of 2" width, which is intended to carry a load of 300 pounds, may have textile cords of ⅛" diameter arranged close to one another in a multiplicity of convolutions lengthwise of the belt.

The utility of this construction has been shown by a belt transmission test on a dynamometer. A belt of 4" width was made up of only the cord portion of the illustrated belt above described, which consisted of the longitudinal system of cords embedded in a mastic of rubber and surrounded by a retaining textile fabric. A second belt was made of a similar fabric and cord belt cemented to a standard 4" leather belt. Each belt was run at a speed of 2200 feet per minute under a tension of 460 pounds with a 2% slippage. The cord belt pulled a load of approximately 10 horse power. The leather faced cord reinforced belt under identical conditions of belt speed, running tension and slippage had a rating of 29.4 horse power. It stretched only ₁⁄₁₆ of 1" under the specified tension and load. A double ply leather belt of similar size and made in accordance with the prior art practice without any reinforcement had a rating of 26.4 horse power, but the belt stretched 2%. Hence, the leather faced, cord reinforced belt can be subjected to a far greater tension than an all leather belt for heavy duty work without material stretching, and it has a greatly superior traction effort over the fabric and cord belts which have rubber or other plastic at the traction surface and do not have a leather facing. A reinforced belt made according to this invention will carry at least twice the load that can be carried by an all leather belt of the same width and which has the total thickness of both the leather and reinforcement layers of my belt without stretching as much as will the all leather belt. The cord reinforced, leather faced belt also gives a more dependable speed control and a far greater safety factor when a heavy load is needed and has a long life of low maintenance upkeep. The belt length does not vary with atmospheric conditions and has adequate flexibility for all the desired uses to which a leather belt may be subjected. Since the leather is on the inside of the belt, it is subjected to compression and not tension as it goes over the pulley, and the cord reinforcement is adequate to withstand the required tension without material elongation.

Various modifications in this construction will now be readily apparent; hence this disclosure is to be interpreted as illustrating the preferred embodiments and the principles of my invention and not as imposing limitations on the appended claims.

I claim:

1. A flat power transmission belt consisting of a single leather strip forming the sole traction surface of the belt, a flexible fabric layer, a cement adhesively securing the fabric directly to the back of the leather strip, a plurality of strands of stretch resisting cord of a diameter between about 1/64 and 1/4 inch mounted in parallelism in a single layer longitudinally of the belt and throughout substantially the entire width thereof, and an elastic deformable rubber mastic between the leather and the fabric which embeds and resiliently supports the cord strands and secures them to the fabric so that the tractive force is transmitted resiliently but directly from the leather to the cords.

2. A power transmission belt consisting of a single leather strip having its ends cemented together and forming an endless continuous traction surface, a single layer of stretch resisting pre-stretched cord strands of a diameter between about 1/64 and 1/4 inch mounted in parallelism lengthwise of and around the outside of the belt and throughout substantially the entire width thereof, an elastic deformable vulcanized rubber mastic between the leather and the fabric which embeds and resiliently supports the cord strands, a single layer of fabric wrapped around the cords and separated therefrom by the mastic and a cement adhering to both the fabric and the back of the leather which secures the cord strands in place so that the tractive force is transmitted directly and resiliently from the leather thereto.

SHERMAN D. LESESNE.

REFERENCES CITED

The following references are of record in the file of this patent:

UNITED STATES PATENTS

| Number | Name | Date |
|---|---|---|
| 1,203,859 | Duecker | Nov. 7, 1916 |
| 1,412,309 | Lambert | Apr. 11, 1922 |
| 2,112,525 | Foster | Mar. 29, 1938 |

FOREIGN PATENTS

| Number | Country | Date |
|---|---|---|
| 521,117 | Great Britain | May 13, 1940 |